May 5, 1970 G. H. FREIER 3,510,137

RECORD PLAYERS

Filed Feb. 13, 1967

Inventor
Gerald H. Freier
By Brown, Jackson, Boettcher & Dienner
Att'ys.

United States Patent Office 3,510,137

Patented May 5, 1970

3,510,137

RECORD PLAYERS

Gerald H. Freier, Benton Harbor, Mich., assignor to V-M Corporation, Benton Harbor, Mich., a corporation of Michigan Filed Feb. 13, 1967, Ser. No. 615,410
Int. Cl. G11b *3/00*
U.S. Cl. 274—9 17 Claims

ABSTRACT OF THE DISCLOSURE

A record player in which the turntable and tone arm are moutned on a works unit plate which is suspended from the base plate on which the turntable drive motor is mounted by means of a system of rigid links having their ends connected by grommets to the works unit plate and base plate, the works unit plate also having studs protruding through holes in the base plate by which the works unit plate may be releaseably locked to the base plate using appropriately threaded screws and cupped washers and which studs in their releaseable state permit limited lateral movement of the works unit plate on its suspension system.

This invention relates to a record player and more particularly to a novel and improved arrangement for supporting its turntable and associated mechanisms including its drive motor.

In record players it is important to be able to isolate the turntable from the vibrations of the drive motor since these vibrations when transferred to a record mounted on the turntable deleteriously affect the quality of the sound which is picked up by the stylus of the pick up arm. The rumble, wow and flutter which said vibrations induce are particularly annoying in the case of high fidelity recordings. It has therefore been previously proposed to mount the pick up arm, turntable and associated mechanical linkages and/or members for effecting a record change cycle on a plate which is separate from the main support or base plate which supports the turntable drive motor.

The present invention comprises a novel and improved arrangement for suspending such a works unit in position beneath the base plate, the supports for rotatably mounting the turntable and pivotally supporting the tone arm extending through provided openings of suitable size in the base plate.

In accordance with the present invention, and it is an important feature thereof, that the works unit or subplate is suspended from beneath the base plate by three spaced hangers, two of which comprise solid rigid pins or links, one end of which is held in an elastic grommet seated in the base plate and the other end of which is held in a second elastic grommet seated in the works unit plate. Said two hanger pins or links are arranged in spaced parallel relation on opposite sides of the turntable center and define a plane which intersects and generally includes the axis of the turntable center spindle about which it rotates. The third hanger is spaced to one side of said plane and may be of a similar construction. Advantageously, it may be of a more compliant nature.

The elastic grommets in which the base plate and works unit plate are mounted provide a limited universal resilient connection therebetween and the rigid links which accommodate lateral movement of the works unit plate akin to a pendulum and such that the parts and/or components mounted on the works unit plate are isolated from the vibrations of the drive motor which is supported on the base plate. At the same time, the rigid solid links maintain the two plates in a desired spacial relation and limit the vertical movement of the works units plate which could be transferred to the turntable and record supported thereon.

Thus a feature of the invention is that the works mechanism of the record player are supported so as to have relatively free lateral movement and thereby completely insulated from the vibration of the drive motor mounted on the base plate.

The elastic grommets not only isolate the pivotal movement of the hanger pins at either end thereof, but also limit the vertical deflection of the works unit plate as the record load on the turntable is varied.

Thus a further feature of the invention is the provision of means which absorb the load of records on the turntable so that the works unit plate remains essentially level. This is obtained by reason that the two mentioned hangers comprising rigid links connected to the two plates by elastic grommets at either end thereof are located to define a plane which passes through the center line of the record supporting spindle so that the load of the records on the turntable does not affect the load on the third hanger, and this is true without regard to the vertical compliance of the third hanger.

A further feature of the invention is that the said two hangers comprising rigid links elastically connected to the opposed plates and the plane defined thereby are so related to the pick up arm pivot, the centerline of the pick up cartridge (plane through which the stylus moves) and the path of stylus travel such that the path of stylus travel closely follows said plane and the pick up plane through which the stylus swings in the act of playing remains essentially perpendicular to said suspension plane. This has the important advantage that the stylus is operating through the most stable portion of the turnable. And any vertical disturbance at the third hanger which would vertically move the pivot of the pick up arm has little or no effect on the stylus as it traverses the groove in the record with rotation of the turntable. Thus true fidelity in reproduction is maintained while keeping noise to a minimum.

Still another feature of the invention is the provision of upstanding studs on the works unit plate which protrude through enlarged openings in the base plate and so serve in normal use of the record player to limit the lateral movement of the works unit plate. Although it is important that the works unit plate be free for lateral movement relative to the base plate so as to isolate the vibration of the base plate therefrom, it will be appreciated that excessive lateral movement is also undesirable because of the possibility that mechanisms mounted on the works unit plate can accidentally be damaged or its operation hampered by accidentally hitting some portion of the base plate in such lateral movement of the works unit plate. This is avoided by the limiting function of the studs which protrude through said opening in the base plate.

In accordance with the invention, these studs are also utilized as a lock down by means of which the works unit plate can be lifted off the suspension hanger pins and temporarily locked to the base plate. For example, this would be important when shipping or transporting the player to avoid the possibility of accidental damage to the components mounted on the works unit plate.

In one form of the invention such lock down is obtained by providing said studs with shoulders and releasably connecting cupped washers to the ends of the studs between which the base plate may be clamped.

Thus an object and important feature of the invention is the provision of a suspension system for the works unit plate which permits relatively free lateral movement but only limited vertical movement of the works unit plate wherefore vibrations imparted to the base plate by operation of the drive motor in rotating the turntable are isolated from and not transferred to the turntable itself and other mechanisms supported on the works unit plate.

Another feature is that by the arrangement the turntable is held essentially level and without regard to changes in record loading of the turntable.

Yet another feature of the invention is the provision had for limiting the lateral movement of the works unit plate to one that can be tolerated and wherein the means which limit excessive lateral movement of the works unit plate are also useful for locking the suspended works unit plate and its mechanisms to the base plate, as during shipment to eliminate possible damage to the normally suspended parts.

Still another feature of the invention is the novel arrangement utilized for supporting the turntable such that the stylus of the pick up arm moves through a relatively stable position of the turntable and a position which is least effected by lateral movement, tilting or other vertical disturbances of the works unit plate.

Many other and further objects, features and advantages of the invention will be apparent from the following description of an illustrated embodiment thereof given for the purposes of disclosure, and taken in conjunction with the accompanying drawings in which like character references designate like parts throughout the several views and where:

Figures 1, 2, 5:
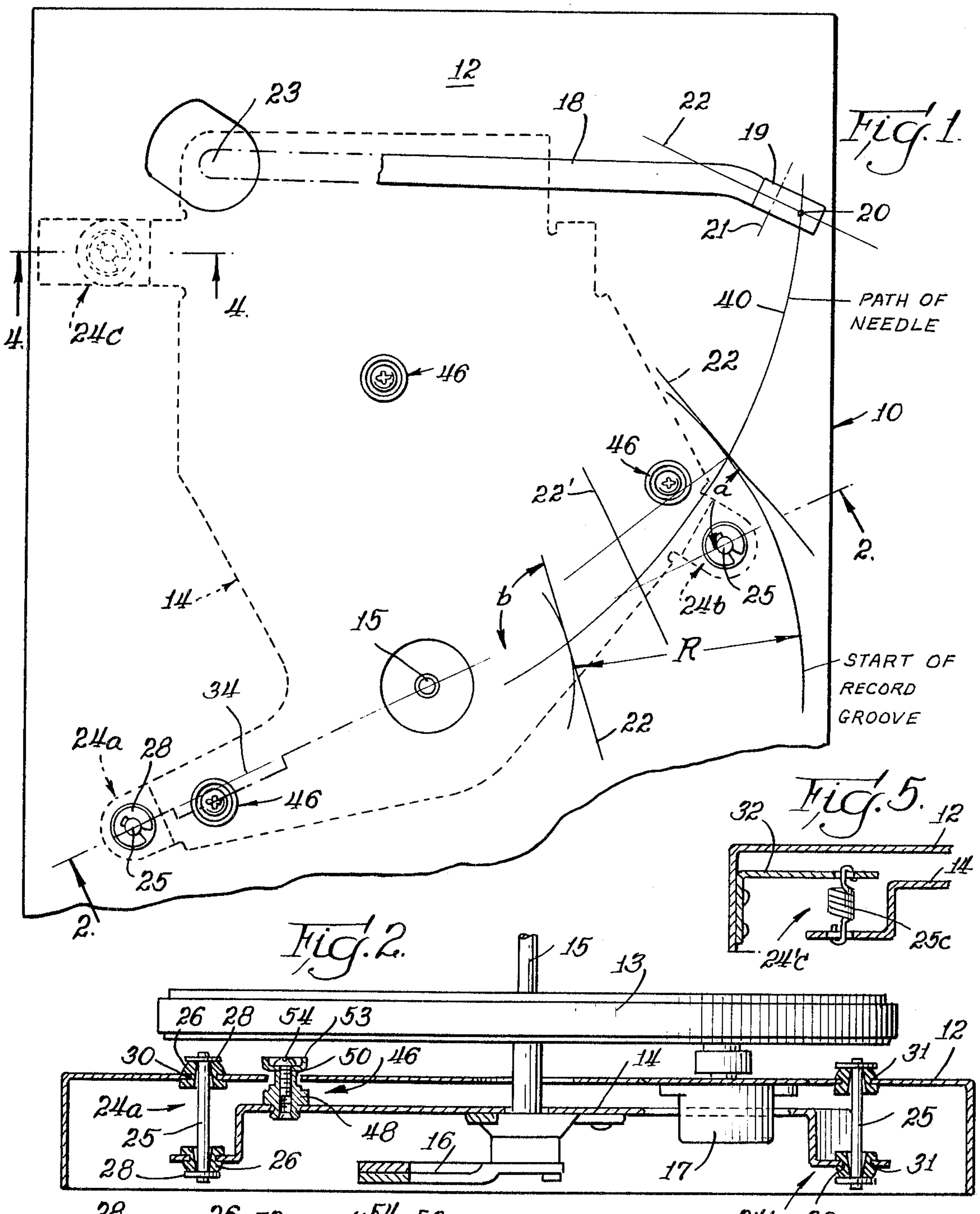
FIG. 1 is a top plan view of a record changer employing a base plate and a works unit plate suspended therefrom in accordance with the present invention.
FIG. 2 is a vertical sectional view taken susbtantially along line 2—2 of FIG. 1 and looking in the direction indicated by the arrows.
FIG. 5 is a vertical sectional view generally similar to that shown in FIG. 4 and illustrating an alternate construction of third hanger member for suspending the works unit plate from the base plate.

Referring now more specifically to the several views which illustrate the invention, and first to FIG. 1, the invention is shown embodied in a record changing device of conventional construction which is illustrated generally by the reference numeral 10. For the purpose of this invention, such record changer will be understood to include a base plate 12 and a works unit mounting plate 14. The latter carries a rotatably supported turntable 13 (FIG. 2), the support for which and a record spindle 15 extends upwardly through a provided opening in the base plate 12. Associated with the center spindle are means also mounted on the sub-plate 14 for effecting a record change cycle shown generally at 16. Fixedly mounted on base plate 12 is a motor 17 adapted to have driving engagement with the turntable 13 by conventional means (not shown). Also mounted on sub-plate 14 and protruding upwardly therefrom through a provided opening in the base plate 12 is suitable structure to which pick up arm 18 is mounted in conventional manner. At its free end pick up arm 18 carries a cartridge 19, including a stylus 20 mounted cantilever fashion to turn about an axis 21 such that in the act of tracking the groove of a record in reproducing sound therefrom the stylus moves through a vertical plane 22 considered as extending longitudinally of the cartridge 19. As illustrated, the cartridge 19 and said plane 22 are disposed angularly with respect to a length of the pick up arm 18. This is conventional and serves to place cartridge 19 and said plane 22 tangential to the recorded groove on the record being played. However, if desired, plane 22 could be located along the axis of the pick up arm 18 if it were convenient to move the vertical pivot axis 23 further from the edge of the turntable. As is well known, in order to move the pick up arm and its stylus to a position off the record turntable and also to permit the stylus 20 to track in the groove of the music band on the record as it is being turned with rotation to the turntable, the pick up arm 18 is rotatable horizontally about a vertical axis 23 and which is in addition to any vertical movement which the pick up arm 18 is also provided to permit its lift off from the record. The aforedescribed construction of record player is known and provides the setting in which the present invention is found.

The present invention utilizes a plurality of, and preferably three, suspension members or hangers 24 by which the works unit plate 14 is suspended from the base plate 12 and which are constructed and so arranged as to isolate the components of the record player supported on the works unit plate 14 from the vibrations of the turntable drive motor 17 shown mounted on the base plate 12. Two of said three suspension hangers are identified generally at **24*a* and 24*b*; the third is identified at 24*c*. Suspension hangers 24*a* and 24*b* each comprises a rigid hanger pin or connector link 25 and a pair of elastic grommets 26, one mounted at each end thereof and held in longitudinal axial movement along the link by C-washers 28. Links 25 are generally cylindrical in shape and each of the grommets 26 has a central axial opening through which the link 25 extends. The outside surface of the grommets 26 are hemispheres and peripherally grooved, as at 30, for engagement with the peripheral edge 31 of holes formed in the base plate and works unit plate, said edges 31 seating in said grooves 30**.

Referring to FIG. 2, C-washers 28 affixed to the upper end of the link 25 engage the outer end of the adjacent upper grommet 26 and are supported thereby to hold the link against downward axial movement through the opening in the grommet due to a downwardly directed force, whether the force providing movement in such direction is due to gravity or to some applied force. The C-washer 28 clamped on the lower end of the link engages the lower outer end of the lower grommet 26 and cooperates with the connecting links 25 to support said grommet and the sub-plate in which said grommet is seated; this cooperative engagement restraining the lower grommet 26 against axial movement off the link. Both grommets are under compression between their respective C-washers and their respective peripheral attachment to the plates as opposed to a loose connection and which derives principally by reason of the weight of the works unit plate 14 and its supported structure. The elastic characteristic of the grommets 26, the placement of C-washers 28 and edges 31 of the holes in the two plates cooperating therewith provide elastic means at the two ends of links 25 which effectively isolate vertical vibrations from the works unit. They also accommodate a limited universal pivoting between the two plates and the respective ends of the links 25 to absorb horizontal vibration. By reason of the rigidity of connecting links 25, vertical compliance is minimal through the plane 34 defined by said parallel related links 28 of suspension hangers **24*a* and 24*b* so that an essentially constant spatial relation is maintained between the two plates 12 and 14 at least in the area of said plane 34** and wherefore any motion is essentially lateral and with the result that the works unit plate moves essentailly parallel to the base plate, the action of the suspension hangers being analogous to a pendulum to swing in any direction.

Figure 4:
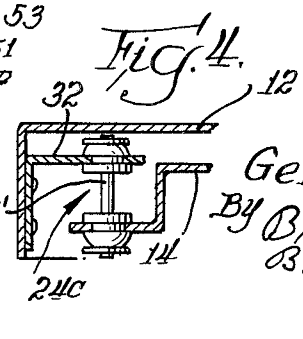
FIG. 4 is a vertical sectional view taken along line 4—4 of FIG. 1 and looking in the direction indicated by the arrows.

As seen in FIG. 4, the third hanger **24*c* may be of a similar construction and comprises a rigid connecting link 25′, although of somewhat shorter length than connecting link 25 of the other two suspension hangers. Link 25′ also has elastic grommets 26 held at its opposed ends by C-washers 28. Although these two grommets are also similarly seated by means of their grooves 30**, engaging about the peripheral edges of provided openings in the base plate 12 and sub-plate 14, the third suspension hanger 24*c* is preferably located outside the periphery of the turntable 15 so as to be adjacent the tone arm pivotal mounting and wherefore to achieve better balance and leveling of the total works unit plate 14. Because in this position the third suspension hanger 24*c* is outside the periphery of the turntable 15, its upper grommet 26 is preferably seated within a hole provided in a hanger bracket 32 mounted to the outside depending lip of the base plate 12 where it is concealed from view. Alternatively, hanger 24*c* may be made more vertically compliant to absorb shock in this area as by substituting a coil spring 25*c* for a rigid link 25'. In this embodiment coil spring 25*c* will have its opposed ends caught by hanger bracket 32 and works unit plate 14 as illustated in said FIG. 5

As mentioned, suspension hangers 24*a* and 24*b* are positioned to define a plane indicated at 34 (FIG. 1) which intersects the axis of rotation of the turntable and also includes the longitudinal or vertical axis of the center spindle 18. Pins or links 25 of said hangers 24*a* and 24*b* being generally vertically disposed, plane 34 defined thereby is also disposed perpendicular to both plates 12 and 14 under normal conditions and including the average of its lateral reciprocation which may occur with vibration of motor 17. Of consequence, as the load of records on the turntable is varied, there is only minimal vertical compliance on the part of hangers 24*a* and 24*b*. Said hangers, by reason of their position, take the brunt of the load change so that the turntable remains essentially level for different record loads imposed on the turntable.

Also, as earlier mentioned, pick up arm 18 and therefore its stylus 20 moves through an arcuate path 40 about pivot axis 23 as it tracks in the groove of a record positioned on turntable 13 to turn therewith. It is a feature of the invention that suspension hangers 24*a* and 24*b* are located equidistantly from and on opposite sides of spindle 15 such that plane 34 is also closely related to said arcuate path through which the stylus travels in following the record groove of the recorded area on the record. This means that the working position of the stylus is located in the most stable portion of the turntable and that which is least subject to vertical disturbance, as for example with the greater vertical compliance of the third hanger 24*c*.

For maximum fidelity in reproducing sound, the plane 22 through which the stylus oscillates is also located as nearly tangential to said record groove as is practicable through the arcuate path 40 of the stylus travel through the recorded band width R of the record. It is therefore preferred to so locate plane 34 that it is perpendicular to the oscillating plane 22 of the stylus. As a practical matter an intermediate perpendicular point is selected which represents the best possible compromise between the start and end of the record band of the record indicated by R. Thus, in one embodiment of the invention the oscillating plane 22 is disposed at about 30° to the longitudinal axis of the pick up arm 18 to permit clearance of the pick up arm 18 with only minimum movement of the stylus away from the turntable. The geometry of the pick up arm and its stylus were selected to play standard 12" diameter high fidelity records having a recording grooved band width of approximately 3.625". This geometry was selected in relation to plane 34 to obtain a maximum fidelity in reproduction of sound with minimum noise. Satisfactory results were obtained wherein the hangers 24*a* and 24*b* were so located that plane 34 defined an angle *a* with respect to the oscillating plane 22 at the beginning of play which was of the order of 80.5° and at the conclusion of play defined by angle *b* of approximately 99.5°. In this arrangement the oscillating plane 22 was nearly perpendicular to plane 34 when the stylus had completed approximately 80% of its travel across the band width of the record. It will be appreciated by the aforesaid arrangement that along plane 34 vertical movement of the turntable with compliance of hanger 24*c* is at a minimum wherefore oscillation of the stylus through its plane 22 is most true. Because stylus 20 moves about pivot 23 it does not exactly follow plane 34 which represents the ideal location for the travel of the stylus; however, by causing plane 34 to intersect arcuate path 40 of the stylus because of the long length of the pick up arm and/or distance of the stylus 20 from center 23 about which its arcuate travel path is defined, the described selection of the location where oscillating plane 22 is perpendicular to plane 34 means that the oscillation of the stylus is nevertheless through a generally stable area and/or one in which any vertical movement of the turntable is exceedingly minimal.

It will be appreciated that the lateral movement experienced by the works unit plate 14 is under ordinary circumstances minimal since the vibrations of the drive motor 17 are largely absorbed by the grommets at the two ends of the rigid connecting pins 24*a* and 24*b*. Although the greater vertical compliance of hanger pin 24*c* may permit some tilting of the works unit plate 14 about plane 34, this nevertheless does not affect the related positions of the pick up arm 18 and turntable 13, since these have a common support on plate 14. However, to guard against possible excessive movement of the works unit plate, as through a sudden jarring of the turntable in consequence of a sudden dropping of a record thereon or the operator accidentally applying too much pressure to one edge of the turntable, the invention also provides a safety device which guards against the possibility of the delicately constructed mechanisms mounted on plate 14 being accidentally bumped against the main plate 12 and thereby possibly injured. This limiting means is obtained by utilizing a plurality of studs 48 which are staked to the sub-plate 14 adjacent each of hangers 24*a*, 24*b* and 24*c*, the location thereof preferably being in the confines of the turntable 13 so as to be concealed thereby. Aligned above said studs 48 are opening 50 provided in the base plate through which said studs 48 extend. (FIG. 2). Openings 50 are sized sufficiently larger than the diameter of the protruding end 52 of said studs so as to accommodate lateral movement of the sub-plate 14 within the tolerated limits, but small enough so that the peripheral edge of said holes 50 act as an abutment or stop which limits said movement of the works unit plate 14 in order to prevent the components thereon from accidentally hitting and thereby being damaged by contact with the base plate 12.

Figure 3:
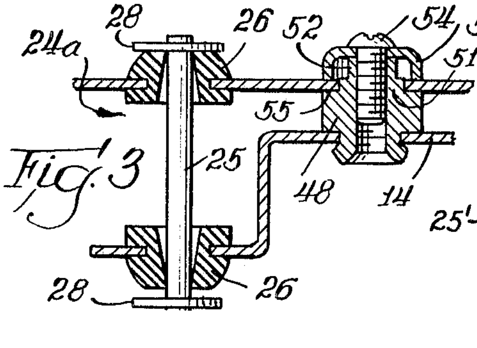
FIG. 3 is a fragmented sectional view comprising the left hand portion of FIG. 2 and illustrating the works unit plate locked to the base plate when as for shipment of the record player.

In accordance with the invention, studs 48 are also utilized as a part of a lock down arrangement by which the works unit plate can be secured to the base plate to prevent movement thereof and its support of mechanisms on the compliant hangers 24*a*, 24*b* and 24*c* when the record changer is being transported, shipped or otherwise roughly handled. Such lock down arrangement includes the aforementioned stud members 48 which for this purpose are provided with an enlarged shoulder 51 below their protruding end 52 and a surrounding annular shelf 55. Shoulder 51 is of a size corresponding to the diameter of the opening 50 so as to be snugly received therein and annular shelf 59 is so located as to abut the underside of the surrounding marginal edge of the hole 50 whereby shelf 55 and shoulder 51 can be caused to limit both lateral and vertical movement of the works unit plate 14. This is accomplished by means of a cupped washer 53 shown in FIG. 3 secured to the upper end of a stud as by bolt 54. As shown in said FIG. 3, said cupped washer 53 has an outside diameter that is larger than the hole 50 in the base plate 12 such that when face down, by threading screw 54 into the stud its outside edges can be drawn into contact with plate 12 and so as to clamp the edges of the plate 12 about hole 50 between said edges of the cupped washer 53 and annular shelf 55. The thus described lock down of the two plates 12 and 14 securely unitizes the two plates 12 and 14 by immobilizing the compliance action of the hangers 24*a*, 24*b* and 24*c*.

Washers 53 are also so cupped that when positioned in reverse with their outer edges upwardly as for example as shown in FIG. 2, a gap will exist therebetween and the surrounding edge of the hole 50 wherefore the cupped washer may be safely stored on the end of the stud 48 by the same screw or bolt 53 and in this stored position will not interfere with the normal lateral movement of the works unit supporting plate 14.

As thus described it will be appreciated that in accordance with the invention the works of the record changer are supported by means of a plate 14 which is suspended from the base plate 12 thereof by means of a suspension system which permits isolated lateral movement of the works unit plate with respect to the base plate while also absorbing vibrations sufficiently that the same are not readily transferred from one plate to the other. Furthermore the suspension system provides at least two hangers which together define a plane disposed substantially perpendicular to the two blades and passing through the axis of the record spindle and about which the records are rotated. These two hangers are so constructed as to provide only limited vertical compliance through said plane wherefore the turntable is kept essentially level without regard to the vertical compliance of the third suspension hanger which is located to one side of said plane and preferably adjacent the pick up arm mounting in order to absorb shocks directed on the pick up arm. Furthermore the geometry of the path of the stylus and its oscillating plane is also closely related to the suspension system and particularly to hangers of limited vertical compliance such that the effects of any vertical disturbance applied either to the works unit or the turntable to one side of the said plane or center of rotation of the turntable has only minimal, if any, effect on the pick up of the stylus moving in the record groove. The invention further provides lock down means which when engaged lift the work plate from the suspension means so that the components of the changer mounted on the works unit plate are locked to the base plate as a unit. When the lock down system is released, however, it serves as a safety means which limits the lateral movement of the works unit plate with respect to the base plate, but within tolerable limits such that the works and/or mechanisms are not injured through accidental jarring of the turntable for example.

Thus it will be appreciated that all of the recited objects, advantages and features set forth for the invention have been demonstrated as obtainable in a highly practical mechanism and one that is not only simple and positive in operation but also inexpensive to manufacture. It will be further understood that although I have described my invention with respect to certain specific embodiments thereof, I do not wish to be thereby limited, since various modifications of my invention are intended to be encompassed within its true spirit and scope.

I claim:

1. In a record player, the combination of a works unit plate which rotatably supports a turntable, a base plate which supports a drive motor for rotating said turntable, and compliant hanger means which suspend said works unit plate to beneath said base plate, two of said hanger means comprising normally vertically disposed links extending through vertically aligned openings in said plates with an abutment member secured at their opposite outer ends, an elastic grommet disposed around each of said outer ends of said links between said abutment members and said respective plates so as to accommodate limited pivotal movement between each end of the links and the plate to which it is connected, said links being on opposite sides of a center axis about which the turntable is rotated by the drive motor and defining a vertical plane including said center axis.

2. The combination of claim 1 wherein said elastic grommets are seated in said openings in the respective plates whereby to accommodate lateral movement of one plate relative to the other.

3. The combination of claim 1 wherein one of said plates includes studs which extend through larger sized openings in the other plate for limiting lateral movement between said plates to within tolerable limits.

4. The combination of claim 2 wherein lock means are associated with each said studs which are operable to lock the two plates together and inhibit movement of one plate relative to the other.

5. The combination of claim 1 wherein the works unit plate also supports a pick up arm for pivotal movement about an axis spaced parallel to said axis of rotation of the turntable, said pick up arm having a stylus adjacent its free end for tracking in the groove of a record supported on the turntable, and the plate defined by the two links being disposed substantially along the arcuate path which said stylus follows in tracking in said record groove.

6. The combination of claim 5 wherein said stylus also moves through a plane which is parallel to said turntable axis of rotation and nearly perpendicular to said plane defined by the two links while said stylus is tracking in the groove of a record supported on the turntable.

7. The combination of claim 5 wherein the stylus moves through a plane which parallels said turntable axis of rotation and also perpendicularly intersects said plane defined by the two links at a location inwardly of what is considered to be the start of the groove of the records to be mounted on the turntable.

8. The combination of claim 7 wherein said intersection is closer to the end of the record groove than to the start thereof.

9. The combination of claim 1 wherein the record player further includes a stylus mounted to move through a path inwardly toward the center of rotation of the turntable, and the plane defined by the two links lies generally along said path of the stylus.

10. The combination of claim 1 wherein the record player further includes a stylus adapted to oscillate through a vertical plane as it moves toward the center of the turntable while tracking in the groove of a record supported on the turntable with rotation thereof, and the plane defined by the two links being generally perpendicular to said plane in which the stylus oscillates.

11. The combination of claim 10 wherein said path of the stylus is also generally along said plane defined by the two links.

12. The combination claimed in claim 1 wherein the compliant hanger means are three in number, all three comprising rigid links having resilient connection of their opposite ends to the works unit plate and base plate.

13. The combination claimed in claim 1 wherein the hanger means are three in number and the third hanger means comprises a vertically compliant member connected between the two plates.

14. In a record player, the combination of a works unit plate which rotatably supports a turntable, a base plate which supports a drive motor for rotating said turntable, compliant hanger means which secure said work units plate to beneath said base plate, two of said hanger means comprising normally vertically disposed rigid links having resilient connection of their opposite ends to said respective plates, said links being on opposite sides of a center axis about which the turntable is rotated by the drive motor and including said center axis, one of said plates including studs which extend through larger sized openings in the other plate for limiting lateral movement between said plates to within tolerable limits, and lock means associated with said studs which are operable to lock the two plates together and inhibit movement of one plate relative to the other, each said studs including a shouldered portion of a diameter greater than its protruding end and which corresponds to that of the aligned opening in the other plate, said studs further including an abutment below said shouldered portion between which and the releaseable lock means the base plate is securable.

15. In a record player, the combination of a base plate, a sub-plate compliantly suspended to said base plate, and means limiting relatively lateral movement of the plates, said means comprising an opening provided in one said plate and a stud secured to the other plate, said stud including a portion protruding through said opening, a larger shouldered portion drawable into said opening and an underlying abutment, and fastening means by which said stud may be drawn into said opening to clamp said one plate to said abutment, said shouldered portion of the stud being so proportioned as to engage and snugly seat in the hole when so drawn whereby both axial and lateral movement between the plates is prevented.

16. The combination as claimed in claim 15 wherein the said fastening means comprises a cupped washer selectively securable in a first position on the protruding portion of said stud where the edge of said washer engages the periphery of said hole to clamp said one plate to said abutment on the stud and in a second position where the edge of said washer is spaced from said one plate to permit relative lateral movement between the plates.

17. In a record changer, the combination of a base plate, a sub-plate and hanger means secured therebetween adapted for isolating vibratory movement between said plates while maintaining minimum vertical deflection between the plates, each said hanger means comprising a pair of connector members of limited compressibility, each separately attached to a respective one of the plates and having an axial opening therethrough, a rigid link having its opposed ends extending through said openings of the compressible connector members, and stop means attached to each end of said links such that said connector members at the two ends of the rigid link are compressed between a respective stop means and the plate to which it is attached so as to accommodate limited pivotal movement between the respective ends of the links and the base plate and sub plate, and the rigid links maintaining an essentially stable spatial relation between the two plates.

References Cited

UNITED STATES PATENTS

| | | | |
|---|---|---|---|
| 3,272,512 | 9/1966 | Zarn | 274—39 |
| 3,025,066 | 3/1962 | Siebert | 274—39 |
| 2,642,253 | 6/1953 | Markowitz | 248—22 |
| 2,520,757 | 8/1950 | Cain | 248—22 |

FOREIGN PATENTS

| | | |
|---|---|---|
| 1,016,403 | 1966 | Great Britain. |
| 974,563 | 1961 | Germany. |

OTHER REFERENCES

Radio Electronics, vol. 28, No. 10, October 1957, pp. 40–43, Record Tracking.

HARRY N. HAROIAN, Primary Examiner

U.S. Cl. X.R.

248—358; 274—39

PO-1050
(5/69)

UNITED STATES PATENT OFFICE
CERTIFICATE OF CORRECTION

Patent No. 3,510,137 Dated May 5, 1970

Inventor(s) Gerald H. Freier Case 7

It is certified that error appears in the above-identified patent and that said Letters Patent are hereby corrected as shown below:

In the Abstract of the Disclosure : Line 2 "moutned" should read --mounted--.

Column 8, line 18 (Claim 5 - line 6) "plate" should read --plane--.

SIGNED AND SEALED
OCT 13 1970

(SEAL)
Attest:

Edward M. Fletcher, Jr.
Attesting Officer

WILLIAM E. SCHUYLER, JR.
Commissioner of Patents